United States Patent
Sokolowski

(10) Patent No.: US 8,178,610 B2
(45) Date of Patent: May 15, 2012

(54) POLYAMIDE/POLY(ARYLENE ETHER) COMPOSITION, METHOD, AND ARTICLE

(75) Inventor: Alex Dimitri Sokolowski, Albany, NY (US)

(73) Assignee: Sabic Innovative Plastics IP B.V. (NL)

( * ) Notice: Subject to any disclaimer, the term of this patent is extended or adjusted under 35 U.S.C. 154(b) by 814 days.

(21) Appl. No.: 12/267,088

(22) Filed: Nov. 7, 2008

(65) Prior Publication Data

US 2009/0306273 A1    Dec. 10, 2009

Related U.S. Application Data

(60) Provisional application No. 61/060,169, filed on Jun. 10, 2008.

(51) Int. Cl.
- *C08L 53/00* (2006.01)
- *C09J 7/02* (2006.01)
- *B60C 1/00* (2006.01)
- *C08K 3/40* (2006.01)

(52) U.S. Cl. ........................ 524/505; 524/494

(58) Field of Classification Search .................. 524/505, 524/494

See application file for complete search history.

(56) References Cited

U.S. PATENT DOCUMENTS

| | | |
|---|---|---|
| 3,379,792 A | 4/1968 | Finholt |
| 3,431,323 A | 3/1969 | Jones |
| 4,772,664 A | 9/1988 | Ueda et al. |
| 4,863,996 A | 9/1989 | Nakazima et al. |
| 5,132,365 A | 7/1992 | Gallucci |
| 5,159,008 A | 10/1992 | Nishida et al. |
| 5,468,530 A | 11/1995 | Gotz et al. |
| 6,166,115 A * | 12/2000 | Landa .......................... 524/115 |
| 6,576,700 B2 | 6/2003 | Patel |
| 6,593,411 B2 | 7/2003 | Koevoets et al. |
| 2006/0231809 A1* | 10/2006 | Fishburn et al. ......... 252/519.33 |

FOREIGN PATENT DOCUMENTS

| | | |
|---|---|---|
| EP | 823457 A2 | 2/1998 |
| EP | 1816166 A1 | 8/2007 |

OTHER PUBLICATIONS

Sabic Technical Data Sheet for PPO Resin 640.*
JP 4198360, Abstract, 1 page, Jul. 17, 1992.
ASTM D789-07, Standard Test Methods for Determination of Solution Viscosities of Polyamide (PA), Jun. 5, 2008.
ASTM D3763-06, Standard Test Method for High Speed Puncture Properties of Plastics Using Load and Displacement Sensors, Feb. 23, 2007.
ISO 178, Plastics—Determination of flexural properties, Dec. 15, 2001.
ISO 527-2, Plastics—Determination of tensile properties, Jun. 15, 1993.
ISO 1133, Plastics—Determination of the melt mass-flow rate (MFR) and the melt volume-flow rate (MVR) of thermoplastics, Jun. 1, 2005.
ASTM D648-06, Standard Test Method for Deflection Temperature of Plastics Under Flexural Load in the Edgewise Position, Jul. 31, 2006.

* cited by examiner

*Primary Examiner* — Mark Eashoo
*Assistant Examiner* — Angela C Scott
(74) *Attorney, Agent, or Firm* — Cantor Colburn LLP

(57) ABSTRACT

A polyamide/poly(arylene ether) composition includes specific amounts of a block copolymer, glass fibers, and a compatibilized blend of at least two polyamides and a poly(arylene ether). The composition is particularly useful for molding automotive under-the-hood components that exhibit an improved balance of moldability, heat resistance, and resistance to brittle failure.

28 Claims, No Drawings

POLYAMIDE/POLY(ARYLENE ETHER) COMPOSITION, METHOD, AND ARTICLE

CROSS REFERENCE TO RELATED APPLICATION

This application claims the benefit of U.S. Provisional Patent Application Ser. No. 61/060,169 filed Jun. 10, 2008, which is fully incorporated herein by reference.

BACKGROUND OF THE INVENTION

Poly(arylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether)s with various other plastics in order to meet the requirements of a wide variety of consumer products, for example, plumbing fixtures, electrical boxes, automotive parts, and insulation for wire and cable.

Poly(arylene ether)s have been blended with polyamide resins to provide compositions having a wide variety of beneficial properties such as heat resistance, chemical resistance, impact strength, hydrolytic stability, and dimensional stability. While known blends of poly(arylene ether)s and polyamides are useful for fabricating a wide variety of objects, they are deficient in one or more properties needed for other uses. For example, poly(arylene ether)/polyamide blends cannot simultaneously deliver the stiffness, heat resistance, and fatigue resistance desired for some automotive under-the-hood electrical connectors. There is therefore a need for poly(arylene ether)/polyamide blends exhibiting an improved balance of stiffness, heat resistance, and fatigue resistance.

BRIEF DESCRIPTION OF THE INVENTION

The above-described and other drawbacks are alleviated by a composition, comprising: 65 to 92 weight percent of a compatibilized blend of a polyamide and a poly(arylene ether); 3 to 9 weight percent of a polystyrene-poly(ethylene-butylene)-polystyrene triblock copolymer; and 5 to 15 weight percent glass fibers; wherein the composition comprises 40 to 50 weight percent of a first polyamide-6,6 having a first relative viscosity, and 10 to 20 weight percent of a second polyamide-6,6 having a second relative viscosity greater than the first relative viscosity; wherein the composition comprises 15 to 30 weight percent of the poly(arylene ether); wherein the poly(arylene ether) has a monomodal molecular weight distribution and an intrinsic viscosity of 0.28 to 0.38 deciliter per gram, as measured at 25° C. in chloroform; and wherein all weight percents are based on the total weight of the composition.

Another embodiment is a method of preparing a composition, comprising: melt kneading 40 to 50 weight percent of a first polyamide-6,6 having a first relative viscosity, 10 to 20 weight percent of a second polyamide-6,6 having a second relative viscosity greater than the first relative viscosity, 15 to 30 weight percent of a poly(arylene ether) having a monomodal molecular weight distribution and an intrinsic viscosity of 0.28 to 0.38 deciliter per gram, as measured at 25° C. in chloroform, 3 to 9 weight percent of a polystyrene-poly(ethylene-butylene)-polystyrene triblock copolymer, 5 to 15 weight percent glass fibers, and an amount of a compatibilizing agent effective to compatibilize the polyamide and the poly(arylene ether), thereby forming the compatibilized blend of a polyamide and a poly(arylene ether); wherein all weight percents are based on the total weight of the composition.

These and other embodiments, including articles comprising the composition, are described in detail below.

DETAILED DESCRIPTION OF THE INVENTION

Research leading to the present invention was stimulated by reports that automotive under-the-hood electrical connectors injection molded from prior art polyamide-poly(arylene ether) compositions were exhibiting an undesirable rate of brittle failure while in use (that is, over an extended period that included multiple connection and disconnection events, or during tests simulating such conditions). Because the prior art compositions included a continuous polyamide phase and a dispersed poly(arylene ether) phase, it was expected that the physical properties of the blend would be strongly dependent on the composition of the polyamide continuous phase composition and much less dependent on the dispersed poly(arylene ether) phase. Attempts were therefore made to reduce the brittle failure by modifying the composition of the polyamide continuous phase. However, the same composition changes that reduced the brittle failure problem also reduced the melt flow of the composition and thus interfered with the ability to injection mold intricately shaped parts. In the course of his research, the present inventor unexpectedly discovered that the melt flow could be substantially improved without sacrificing physical properties by modification of the composition of the poly(arylene ether) dispersed phase. Specifically, a significant improvement in the overall property balance is observed in glass-filled compositions when a blend of high-flow and low-flow polyamides is used in conjunction with a poly(arylene ether) having a monomodal molecular weight distribution and an intrinsic viscosity of 0.28 to 0.38 deciliters per gram. This very surprising given that the flow properties of a compatibilized blend with continuous and dispersed phases are usually relatively insensitive to the dispersed phase composition. The unexpected nature of this discovery is further reinforced by three observations. First, a poly(arylene ether) component having the same intrinsic viscosity but a bimodal molecular weight distribution did not deliver the same benefits. Second, the melt flow improvement exhibited by the present compositions is not observed in compatibilized polyamide-poly(arylene ether) blends with other polyamides. Third, the melt flow improvement exhibited by the present compositions is not observed in compatibilized polyamide-poly(arylene ether) blends lacking glass fibers. The flow-increasing effect of reducing the poly(arylene ether) intrinsic viscosity is also unexpected given the teaching of Lee et al. that reducing the intrinsic viscosity of the poly(phenylene ether) in a polyamide-6,6/poly(phenylene ether) blend from 0.46 to 0.28 deciliter per gram increased the heat deflection temperature of the blend from 365° C. to 382° C. European Patent Application No. EP 0 823 457 A2, published Feb. 11, 1998, pages 11-12, Table 2.

Thus, one embodiment is a composition, comprising: 65 to 92 weight percent of a compatibilized blend of a polyamide and a poly(arylene ether); 3 to 9 weight percent of a polystyrene-poly(ethylene-butylene)-polystyrene triblock copolymer; and 5 to 15 weight percent glass fibers; wherein the composition comprises 40 to 50 weight percent of a first polyamide-6,6 having a first relative viscosity, and 10 to 20 weight percent of a second polyamide-6,6 having a second relative viscosity greater than the first relative viscosity; wherein the composition comprises 15 to 30 weight percent of the poly(arylene ether); wherein the poly(arylene ether)

has a monomodal molecular weight distribution and an intrinsic viscosity of 0.28 to 0.38 deciliter per gram, as measured at 25° C. in chloroform; and wherein all weight percents are based on the total weight of the composition.

It will be understood that the phrase "wherein the poly (arylene ether) has a monomodal molecular weight distribution" refers to the entire poly(arylene ether) content of the composition. Therefore, the word "comprising" as used in any claim herein does not permit the addition of further poly(arylene ether) species that would prevent the total poly(arylene ether) content of the composition from having a monomodal molecular weight distribution.

The composition comprises 65 to 92 weight percent of a compatibilized blend, based on the total weight of the composition. Within this range, the composition can comprise 70 to 90 weight percent of the compatibilized blend, specifically 80 to 88 weight percent of the compatibilized blend, more specifically 82 to 88 weight percent of the compatibilized blend. The amount of the compatibilized blend is calculated as the sum of all poly(arylene ether)s, all polyamides, and any compatibilizing agents used to form the compatibilized blend.

As mentioned above the thermoplastic composition comprises a compatibilized poly(arylene ether)/polyamide blend. The poly(arylene ether) used to form the compatibilized blend comprises repeating structural units of the formula

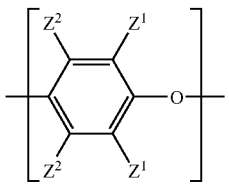

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) consists of poly(2,6-dimethyl-1,4-phenylene ether). In this context, the term "consists of" excludes the reaction products of poly(arylene ether)s and functionalizing agents, such as acid-functionalized poly(arylene ether)s and anhydride-functionalized poly(arylene ether)s.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

As previously mentioned, the poly(arylene ether) has a monomodal molecular weight distribution. This means that the chromatogram from gel permeation chromatography analysis of the poly(arylene ether) has only one local maximum. A gel permeation chromatography method suitable for determining poly(arylene ether) molecular weight values, as well as whether the poly(arylene ether) has monomodal molecular weight distribution, is as follows. The gel permeation chromatograph is calibrated using eight polystyrene standards, each of narrow molecular weight, and collectively spanning a molecular weight range of 3,000 to 1,000,000 grams/mole. The columns used were 1e3 and 1e5 angstrom PLgel columns with a 5 microliter 100 angstrom PLgel guard column. Chromatography was conducted at 25° C. The elution liquid was chloroform with 100 parts per million by weight di-n-butylamine. The elution flow was 1.2 milliliters per minute. The detector wavelengths were 254 nanometers (for polystyrene standards) and 280 nanometers (for poly(2, 6-dimethyl-1,4-phenylene ether)). A third degree polynomial function is fitted through the calibration points. Poly(2,6-dimethyl-1,4-phenylene ether) samples are prepared by dissolving 0.27 grams poly(2,6-dimethyl-1,4-phenylene ether) solid in 45 milliliters toluene. A 50 microliter sample of the resulting solution is injected into the chromatograph. The values of number average molecular weight ($M_n$) and weight average molecular weight ($M_w$) are calculated from the measured signal using the polystyrene calibration line. The values are subsequently converted from polystyrene molecular weight to true poly(2,6-dimethyl-1,4-phenylene ether) molecular weights using the formula: $M(PPO)=0.3122 \times M(PS)^{1.073}$. To determine whether the poly(arylene ether) has a monomodal molecular weight distribution, the chromatogram is visually inspected and a peak with only one maximum should be observed. A peak with two or more maxima across the GPC chromatogram indicates that the poly(arylene ether) does not have a monomodal molecular weight distribution.

The composition is typically prepared from a single poly(arylene ether) component in order to satisfy the monomodal molecular weight distribution limitation. Thus, in some embodiments, the poly(arylene ether) does not comprise a blend of two or more poly(arylene ether)s having different intrinsic viscosities. However, it is possible to use a blend of two or more poly(arylene ether) components, as long as the molecular weight distributions of the components are similar enough so that the total of all poly(arylene ether) components exhibits the required monomodal molecular weight distribution.

The poly(arylene ether) has an intrinsic viscosity of 0.28 to 0.38 deciliters per gram (dl/g), as measured in chloroform at 25° C. In some embodiments, the poly(arylene ether) intrinsic viscosity is 0.30 to 0.35 deciliter per gram, specifically 0.30 to 0.33 deciliter per gram. It will be understood that these intrinsic viscosity ranges are for the poly(arylene ether) component used to form the composition, and that the poly(arylene ether) content of the final composition may have an intrinsic viscosity value as much as 0.07 deciliter per gram higher because of the well-known "IV jump" phenomenon by which the poly(arylene ether) molecular weight can increase on compounding with polyamide.

In some embodiments, the poly(arylene ether) has a number average molecular weight of 15,000 to 25,000 atomic mass units. In some embodiments, the poly(arylene ether) has a weight average molecular weight of 45,000 to 55,000 atomic mass units. In some embodiments, the poly(arylene ether) has a polydispersity index of 2.0 to 3.5. It will be understood that these molecular weight properties refer to the poly(arylene ether) content of the final composition.

In some embodiments, the molecular weight distribution of the poly(arylene ether) is limited such that the poly(arylene ether) comprises less than 20 weight percent, specifically less than 10 weight percent, of molecules having a molecular weight less than 10,000 atomic mass units.

In some embodiments, the poly(arylene ether) comprises less than 10 weight percent of molecules having a molecular weight greater than 100,000 atomic mass units.

The composition comprises poly(arylene ether) in an amount of 15 to 30 weight percent, based on the total weight of the composition. In some embodiments, the poly(arylene ether) amount is 18 to 27 weight percent, specifically 20 to 25 weight percent. In some embodiments, the composition comprises less than 28 parts by weight of the poly(arylene ether) per 100 parts by weight total of the first polyamide-6,6, the second polyamide-6,6, and the poly(arylene ether).

The polyamide used to form the compatibilized blend of a polyamide and a poly(arylene ether) comprises a first polyamide-6,6 and a second polyamide-6,6. As used herein, the term polyamide-6,6 refers to poly(hexamethylene adipamide) (CAS Reg. No. 32131-17-2). The first polyamide-6,6 has a relative viscosity (sometimes referred to herein as the "first relative viscosity"), and the second polyamide-6,6 has a relative viscosity (sometimes referred to herein as the "second relative viscosity") that is greater than that of the first polyamide-6,6.

In some embodiments, the first polyamide-6,6 has a (first) relative viscosity of 30 to 40, as measured according to ASTM D789-07 in a 1 weight percent solution of the first polyamide-6,6 in 90 weight percent formic acid. Specifically, the first relative viscosity can be 32 to 39, more specifically 34 to 38. Note that relative viscosity values are unitless. Polyamide-6,6 suitable for use as the first polyamide-6,6 can be prepared by methods known in the art or obtained commercially as, for example, Vydyne 21Z from Solutia.

In some embodiments, the second polyamide-6,6 has a (second) relative viscosity of 40 to 55, as measured according to ASTM D789-07 in a 1 weight percent solution of the second polyamide-6,6 in 90 weight percent formic acid. Specifically, the second relative viscosity can be 42 to 52, more specifically 44 to 50, even more specifically 46 to 50. Polyamide-6,6 suitable for use as the second polyamide-6,6 can be prepared by methods known in the art or obtained commercially as, for example, ULTRAMID 105 from Rhodia Polyamide Corporation.

In some embodiments, the first relative viscosity and the second relative viscosity differ by at least 8, specifically at least 11, more specifically at least 14. In some embodiments, the first relative viscosity and the second relative viscosity differ by 8 to 20, specifically 11 to 17, more specifically 12 to 15.

In some embodiments, the polyamide consists of the first polyamide-6,6 and the second polyamide-6,6.

The composition comprises 40 to 50 weight percent of the first polyamide-6,6, based on the total weight of the composition. Specifically, the first polyamide-6,6 amount can be 42 to 49 weight percent, more specifically 45 to 48 weight percent.

The composition comprises 10 to 20 weight percent of the second polyamide-6,6, based on the total weight of the composition. Specifically, the second polyamide-6,6 amount can be 11 to 18 weight percent, more specifically 13 to 17 weight percent.

As used herein, the term "compatibilizing agent" refers to polyfunctional compounds that interact with the poly(arylene ether), the polyamide resin, or both. This interaction may be chemical (for example, grafting) and/or physical (for example, affecting the surface characteristics of the dispersed phases). In either instance the resulting compatibilized poly(arylene ether)/polyamide composition appears to exhibit improved compatibility, particularly as evidenced by enhanced impact strength, mold knit line strength, and/or elongation. As used herein, the expression "compatibilized poly(arylene ether)/polyamide blend" refers to those compositions which have been physically and/or chemically compatibilized with an agent as discussed above, as well as those compositions which are physically compatible without such agents, as taught in U.S. Pat. No. 3,379,792 to Finholt.

As understood by one of ordinary skill in the art, poly(arylene ether) and polyamide, when combined, form an immiscible blend. Immiscible blends have either a continuous phase and a dispersed phase or two co-continuous phases. When a continuous phase and a dispersed phase are present, the size of the particles of the dispersed phase can be determined using electron microscopy. In a compatibilized poly(arylene ether)/polyamide blend the average diameter of the dispersed phase particles (poly(arylene ether)) is decreased compared to non-compatibilized poly(arylene ether)/polyamide blends. For example, compatibilized poly(arylene ether)/polyamide blends typically have an average poly(arylene ether) particle diameter less than or equal to 10 micrometers. In some embodiments the average particle diameter is greater than or equal to 0.05 micrometer. The average particle diameter in a pelletized blend can be smaller than in a molded article but in either case the average particle diameter is typically less than or equal to 10 micrometers. Determination of average particle diameter is known in the art and is taught, for example, in U.S. Pat. No. 4,772,664 to Ueda et al. and U.S. Pat. No. 4,863,996 to Nakazima et al.

Examples of the various compatibilizing agents that can be employed include liquid diene polymers, epoxy compounds, oxidized polyolefin wax, quinones, organosilane compounds, polyfunctional compounds, functionalized poly(arylene ether)s, and combinations comprising one or more of the foregoing. Compatibilizing agents are further described in U.S. Pat. No. 5,132,365 to Gallucci, and U.S. Pat. No. 6,593,411 to Koevoets et al.

In some embodiments, the compatibilizing agent comprises a polyfunctional compound. Polyfunctional compounds which can be employed as a compatibilizing agent are of three types. The first type of polyfunctional compounds has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (for example, alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}$OH, $C_nH_{2n-7}$OH and $C_nH_{2n-9}$OH, wherein n is 5 to 30; unsaturated amines resulting from replacing from replacing the —OH group(s) of the above unsaturated alcohols with $NH_2$ groups; functionalized diene polymers and copolymers; and combinations comprising one or more of the foregoing. In some embodiments, the compatibilizing agent comprises maleic anhydride, fumaric acid, or a combination of maleic anhydride and fumaric acid.

The second type of polyfunctional compatibilizing agents is characterized as having both (a) a group represented by the formula (OR) wherein R is hydrogen or an alkyl, aryl, acyl, or carbonyl dioxy group and (b) at least two groups each of which can be the same or different selected from carboxylic acid, acid halide, anhydride, acid halide anhydride, ester, orthoester, amide, imido, amino, and various salts thereof. Exemplary of this group of compatibilizers are the aliphatic polycarboxylic acids, acid esters and acid amides represented by the formula

$(R^IO)_mR^V(COOR^{II})_n(CONR^{III}R^{IV})_s$ wherein $R^V$ is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polyfunctional compatibilizing agents of the second type also include, for example, citric acid, malic acid, and agaricic acid, including the various commercial forms thereof, such as for example, the anhydrous and hydrated acids; and combinations comprising one or more of the foregoing. In some embodiments, the compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; N-dodecyl malic acid, and combinations comprising one or more of the foregoing amides. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents is characterized as having in the molecule both (a) an acid halide group and (b) at least one carboxylic acid, anhydride, ester, epoxy, orthoester, or amide group. Examples of compatibilizers within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetyl succinic acid, trimellitic acid chloride, and chloroacetyl glutaric acid. In some embodiments, the compatibilizing agent comprises trimellitic anhydride acid chloride.

The composition is produced by melt blending the components. The foregoing compatibilizing agents can be added directly to the melt blend or pre-reacted with either or both of the poly(arylene ether) and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting can cause the compatibilizing agent to react with the polymer and, consequently, functionalize all or part of the poly(arylene ether). For example, the poly(arylene ether) can be pre-reacted with maleic anhydride to form an anhydride functionalized polyphenylene ether which when melt blended with polyamide and optionally non-functionalized poly(arylene ether) results in a compatibilized poly(arylene ether)/polyamide blend.

Where the compatibilizing agent is employed in the preparation of the compositions, the amount used will be dependent upon the specific compatibilizing agent chosen and the specific polymeric system to which it is added as well as the desired properties of the resultant composition. When the compatibilizing agent is citric acid, it is typically used in an amount of 0.2 to 1 weight percent, specifically 0.3 to 0.5 weight percent, based on the total weight of the composition.

In addition to the compatibilized blend of polyamide and poly(arylene ether), the composition comprises a polystyrene-poly(ethylene-butylene)-polystyrene triblock copolymer. In some embodiments, the polystyrene-poly(ethylene-butylene)-polystyrene triblock copolymer has a weight average molecular weight greater than or equal to 200,000 atomic mass units, specifically 200,000 to 450,000 atomic mass units, more specifically 250,000 to about 400,000 atomic mass units. Methods for making polystyrene-poly (ethylene-butylene)-polystyrene triblock copolymers, including high molecular weight species, are known in the art and described, for example, in U.S. Pat. No. 3,431,323 to Jones. High molecular weight polystyrene-poly(ethylene-butylene)-polystyrene triblock copolymers are also commercially available as, for example, the polystyrene-poly(ethylene/butylene)-polystyrene triblock copolymer having a styrene content of 31 weight percent based and a weight average molecular weight of about 240,000 to about 301,000 atomic mass units (AMU) available from Kraton Polymers as KRATON G 1651, and the polystyrene-poly(ethylene/butylene)-polystyrene triblock copolymer having a styrene content of 31 weight percent based and a weight average molecular weight of about 350,000 to about 450,000 atomic mass units (AMU) available from Kraton Polymers as KRATON MD6933ES.

The composition comprises the polystyrene-poly(ethylene-butylene)-polystyrene triblock copolymer in an amount of 3 to 9 weight percent, specifically 4 to 8 weight percent, based on the total weight of the composition.

In addition to the compatibilized blend of a polyamide and a poly(arylene ether), and the polystyrene-poly(ethylene-butylene)-polystyrene triblock copolymer, the flame retardant composition comprises 5 to 15 weight percent glass fiber, based on the total weight of the composition. In some embodiments, the glass fiber amount is 6 to 12 weight percent, specifically 7 to 9 weight percent. Suitable glass fibers include those based on E, A, C, ECR, R, S, D, and NE glasses, as well as quartz. The glass fiber may have a diameter of about 2 to about 30 micrometers, specifically about 5 to about 25 micrometers, more specifically about 10 to about 15 micrometers. The length of the glass fibers before compounding can be about 0.3 to about 2 centimeters, specifically about 0.5 to about 1.5 centimeters. The glass fiber can, optionally, include a so-called adhesion promoter to improve its compatibility with the thermoplastic composition. Adhesion promoters include chromium complexes, silanes, titanates, zircoaluminates, propylene maleic anhydride copolymers, reactive cellulose esters and the like. Suitable glass fiber is commercially available from suppliers including, for example, Owens Corning, Johns Manville, and PPG Industries.

The composition can, optionally, further comprise one or more additives such as, for example, stabilizers, mold release agents, processing aids, polyamide flow promoters (for example, low molecular weight polyolefins with or without epoxy functionality, low molecular weight ethylene-propylene rubbers, low molecular weight thermoplastic polyesters, and liquid polyolefin rubbers), poly(arylene ether) flow promoters (for example, low molecular weight homopolystyrenes, and low molecular weight rubber-modified polystyrenes), flame retardants, drip retardants, nucleating agents, UV blockers, dyes, pigments, antioxidants, anti-static agents, blowing agents, mineral oil, metal deactivators, antiblocking agents, nanoclays, and combinations thereof.

In some embodiments, the composition comprises a continuous phase comprising the first polyamide-6,6 and the second polyamide-6,6, and a dispersed phase comprising the poly(arylene ether). Microscopy methods capable of detecting the presence of a polyamide continuous phase and a poly(arylene ether) dispersed phase are known in the art.

In some embodiments, the composition excludes fillers other than the glass fibers described herein.

In some embodiments, the composition excludes polymers other than those described herein as required or optional.

The composition exhibits a highly desirable property balance that includes good moldability (particularly injection moldability), resistance of molded parts to brittle failure over extended periods of use, and good heat resistance. An objective correlate of moldability is the melt volume-flow rate. In some embodiments, the composition exhibits a melt volume-flow rate of at least 40 cubic centimeters per 10 minutes, measured at 280° C. and 5 kilogram load according to ISO 1133. Specifically, the melt volume-flow rate can be 40 to 45 cubic centimeters per 10 minutes, measured at 280° C. and 5 kilogram load according to ISO 1133.

The present inventor has found, surprisingly, that tensile elongation is a good predictor of brittle failure over time. Thus, in some embodiments, the composition exhibits a tensile elongation at break of at least 5 percent, specifically 5 to 7 percent, measured at 23° C. according to ISO 527-2.

An objective correlate of heat resistance is heat deflection temperature. In some embodiments, the composition exhibits a heat deflection temperature of at least 220° C., specifically 220 to 255° C., more specifically 230 to 255° C., even more specifically 240 to 255° C., yet more specifically 245 to 255° C., still more specifically 250 to 255° C., all as measured at 0.45 megapascals pressure according to ISO 75.

In a very specific embodiment, the composition comprises 45 to 48 weight percent of the first polyamide-6,6; the first relative viscosity is 34 to 38; the composition comprises 13 to 17 weight percent of the second polyamide-6,6; the second relative viscosity is 46 to 50; the compatibilized blend comprises 20 to 25 weight percent of the poly(arylene ether); the poly(arylene ether) comprises less than 10 weight percent of molecules having a molecular weight less than 10,000 atomic mass units; the composition comprises 4 to 8 weight percent of a polystyrene-poly(ethylene-butylene)-polystyrene triblock copolymer having a weight average molecular weight of 200,000 to 400,000 atomic mass units; the composition comprises 7 to 9 weight percent glass fibers; the composition comprises a continuous phase comprising the first polyamide-6,6 and the second polyamide-6,6; and a dispersed phase comprising the poly(arylene ether); and the composition exhibits a tensile elongation at break of 5 to 7 percent measured at 23° C. according to ISO 527-2, a melt volume-flow rate of 40 to 45 cubic centimeters per 10 minutes, measured at 280° C. and 5 kilogram load according to ISO 1133, a heat deflection temperature of 240 to 255° C. measured at 0.45 megapascals pressure according to ISO 75.

Any of the above-described compositions can be used to form articles. The composition is particularly useful for injection molding articles that must exhibit moderate stiffness, high tensile strength, and heat resistance. Such articles include, for example, automotive snap connectors for under-the-hood use, as well as other automotive under-the-hood components. The composition can be employed in injection molding methods known for polyamide/poly(arylene ether) blends.

Another embodiment is a method of preparing a composition, comprising: melt kneading 40 to 50 weight percent of a first polyamide-6,6 having a first relative viscosity, 10 to 20 weight percent of a second polyamide-6,6 having a second relative viscosity greater than the first relative viscosity, 15 to 30 weight percent of a poly(arylene ether) having a monomodal molecular weight distribution and an intrinsic viscosity of 0.28 to 0.38 deciliter per gram, as measured at 25° C. in chloroform, 3 to 9 weight percent of a polystyrene-poly(ethylene-butylene)-polystyrene triblock copolymer, 5 to 15 weight percent glass fibers, and an amount of a compatibilizing agent effective to compatibilize the polyamide and the poly(arylene ether) to form the compatibilized blend of a polyamide and a poly(arylene ether); wherein all weight percents are based on the total weight of the composition. A detailed method of preparing the composition is described in the working examples below.

In a very specific embodiment of the method, the composition comprises 45 to 48 weight percent of the first polyamide-6,6; the first relative viscosity is 34 to 38, as measured according to ASTM D789 in a 1 weight percent solution of the first polyamide-6,6 in 90 weight percent formic acid; the composition comprises 13 to 17 weight percent of the second polyamide-6,6; the second relative viscosity is 46 to 50, as measured according to ASTM D789 in a 1 weight percent solution of the first polyamide-6,6 in 90 weight percent formic acid; the compatibilized blend comprises 20 to 25 weight percent of the poly(arylene ether); the poly(arylene ether) comprises less than 10 weight percent of molecules having a molecular weight less than 10,000 atomic mass units; the composition comprises 4 to 8 weight percent of a polystyrene-poly(ethylene-butylene)-polystyrene triblock copolymer having a weight average molecular weight of 200,000 to 400,000 atomic mass units; the composition comprises 7 to 9 weight percent glass fibers; the composition comprises a continuous phase comprising the first polyamide-6,6 and the second polyamide-6,6; and a dispersed phase comprising the poly(arylene ether); and the composition exhibits a tensile elongation at break of 5 to 7 percent measured at 23° C. according to ISO 527-2, a melt volume-flow rate of 40 to 45 cubic centimeters per 10 minutes, measured at 280° C. and 5 kilogram load according to ISO 1133, and a heat deflection temperature of 240 to 255° C. measured at 0.45 megapascals pressure according to ISO 75.

The invention includes at least the following embodiments.

Embodiment 1

A composition, comprising: 65 to 92 weight percent of a compatibilized blend of a polyamide and a poly(arylene ether); 3 to 9 weight percent of a polystyrene-poly(ethylene-butylene)-polystyrene triblock copolymer; and 5 to 15 weight percent glass fibers; wherein the composition comprises 40 to 50 weight percent of a first polyamide-6,6 having a first relative viscosity, and 10 to 20 weight percent of a second polyamide-6,6 having a second relative viscosity greater than the first relative viscosity; wherein the composition comprises 15 to 30 weight percent of the poly(arylene ether); wherein the poly(arylene ether) has a monomodal molecular weight distribution and an intrinsic viscosity of 0.28 to 0.38 deciliter per gram, as measured at 25° C. in chloroform; and wherein all weight percents are based on the total weight of the composition.

Embodiment 2

The composition of embodiment 1, wherein the poly(arylene ether) consists of poly(2,6-dimethyl-1,4-phenylene ether).

Embodiment 3

The composition of embodiment 1 or 2, wherein the first relative viscosity is 30 to 40, as measured according to ASTM D789 in a 1 weight percent solution of the first polyamide-6,6 in 90 weight percent formic acid.

Embodiment 4

The composition of any of embodiments 1-3, wherein the second relative viscosity is 40 to 55, as measured according to ASTM D789 in a 1 weight percent solution of the second polyamide-6,6 in 90 weight percent formic acid.

Embodiment 5

The composition of any of embodiments 1-4, wherein the first relative viscosity and the second relative viscosity differ by at least 8.

Embodiment 6

The composition of any of embodiments 1-5, wherein the first relative viscosity and the second relative viscosity differ by 8 to 20.

Embodiment 7

The composition of any of embodiments 1-6, wherein the poly(arylene ether) has a number average molecular weight of 15,000 to 25,000 atomic mass units.

Embodiment 8

The composition of any of embodiments 1-7, wherein the poly(arylene ether) has a weight average molecular weight of 45,000 to 55,000 atomic mass units.

Embodiment 9

The composition of any of embodiments 1-8, wherein the poly(arylene ether) has a polydispersity index of 2.0 to 3.5.

Embodiment 10

The composition of any of embodiments 1-9, wherein the poly(arylene ether) comprises less than 20 weight percent of molecules having a molecular weight less than 10,000 atomic mass units.

Embodiment 11

The composition of any of embodiments 1-10, wherein the poly(arylene ether) comprises less than 10 weight percent of molecules having a molecular weight greater than 100,000 atomic mass units.

Embodiment 12

The composition of any of embodiments 1-11, wherein the poly(arylene ether) does not comprise a blend of two or more poly(arylene ether)s having different intrinsic viscosities.

Embodiment 13

The composition of any of embodiments 1-12, comprising less than 28 parts by weight of the poly(arylene ether) per 100 parts by weight total of the first polyamide-6,6, the second polyamide-6,6, and the poly(arylene ether).

Embodiment 14

The composition of any of embodiments 1-13, wherein the polystyrene-poly(ethylene-butylene)-polystyrene triblock copolymer has a weight average molecular weight of 200,000 to 450,000 atomic mass units.

Embodiment 15

The composition of any of embodiments 1-14, comprising a continuous phase comprising the first polyamide-6,6 and the second polyamide-6,6, and a dispersed phase comprising the poly(arylene ether).

Embodiment 16

The composition of any of embodiments 1-15, exhibiting a tensile elongation at break of at least 5 percent, measured at 23° C. according to ISO 527-2.

Embodiment 17

The composition of any of embodiments 1-16, exhibiting a tensile elongation at break of 5 to 7 percent, measured at 23° C. according to ISO 527-2.

Embodiment 18

The composition of any of embodiments 1-17, exhibiting a melt volume-flow rate of at least 40 cubic centimeters per 10 minutes, measured at 280° C. and 5 kilogram load according to ISO 1133.

Embodiment 19

The composition of any of embodiments 1-18, exhibiting a melt volume-flow rate of 40 to 45 cubic centimeters per 10 minutes, measured at 280° C. and 5 kilogram load according to ISO 1133.

Embodiment 20

The composition of any of embodiments 1-19, exhibiting a heat deflection temperature of at least 220° C. measured at 0.45 megapascals pressure according to ISO 75.

Embodiment 21

The composition of any of embodiments 1-20, exhibiting a heat deflection temperature of 220 to 255° C. measured at 0.45 megapascals pressure according to ISO 75.

Embodiment 22

The composition of embodiment 1, wherein the composition comprises 45 to 48 weight percent of the first polyamide-6,6; wherein the first relative viscosity is 34 to 38; wherein the composition comprises 13 to 17 weight percent of the second polyamide-6,6; wherein the second relative viscosity is 46 to 50; wherein the compatibilized blend comprises 20 to 25 weight percent of the poly(arylene ether); wherein the poly (arylene ether) comprises less than 10 weight percent of molecules having a molecular weight less than 10,000 atomic mass units; wherein the composition comprises 4 to 8 weight percent of a polystyrene-poly(ethylene-butylene)-polystyrene triblock copolymer having a weight average molecular weight of 200,000 to 400,000 atomic mass units; and wherein the composition comprises 7 to 9 weight percent glass fibers; wherein the composition comprises a continuous phase comprising the first polyamide-6,6 and the second polyamide-6,6; and a dispersed phase comprising the poly(arylene ether); and wherein the composition exhibits a tensile elongation at break of 5 to 7 percent measured at 23° C. according to ISO 527-2, a melt volume-flow rate of 40 to 45 cubic centimeters per 10 minutes, measured at 280° C. and 5 kilogram load according to ISO 1133, a heat deflection temperature of 240 to 255° C. measured at 0.45 megapascals pressure according to ISO 75.

Embodiment 23

An article comprising the composition of any of embodiments 1-21.

Embodiment 24

An automotive under-the-hood electrical connector comprising the composition of any of embodiments 1-21.

Embodiment 25

An article comprising the composition of embodiment 22.

Embodiment 26

An automotive under-the-hood electrical connector comprising the composition of embodiment 22.

Embodiment 27

A method of preparing a composition, comprising: melt kneading 40 to 50 weight percent of a first polyamide-6,6 having a first relative viscosity, 10 to 20 weight percent of a second polyamide-6,6 having a second relative viscosity greater than the first relative viscosity, 15 to 30 weight percent of a poly(arylene ether) having a monomodal molecular weight distribution and an intrinsic viscosity of 0.28 to 0.38 deciliter per gram, as measured at 25° C. in chloroform, 3 to 9 weight percent of a polystyrene-poly(ethylene-butylene)-polystyrene triblock copolymer, and 5 to 15 weight percent glass fibers, and an amount of a compatibilizing agent effective to compatibilize the polyamide and the poly(arylene ether) to form the compatibilized blend of a polyamide and a poly(arylene ether); wherein all weight percents are based on the total weight of the composition.

Embodiment 28

The method of embodiment 27, wherein the composition comprises 45 to 48 weight percent of the first polyamide-6,6; wherein the first relative viscosity is 34 to 38, as measured according to ASTM D789 in a 1 weight percent solution of the first polyamide-6,6 in 90 weight percent formic acid; wherein the composition comprises 13 to 17 weight percent of the second polyamide-6,6; wherein the second relative viscosity is 46 to 50, as measured according to ASTM D789 in a 1 weight percent solution of the first polyamide-6,6 in 90 weight percent formic acid; wherein the compatibilized blend comprises 20 to 25 weight percent of the poly(arylene ether); wherein the poly(arylene ether) comprises less than 10 weight percent of molecules having a molecular weight less than 10,000 atomic mass units; wherein the composition comprises 4 to 8 weight percent of a polystyrene-poly(ethylene-butylene)-polystyrene triblock copolymer having a weight average molecular weight of 200,000 to 400,000 atomic mass units; and wherein the composition comprises 7 to 9 weight percent glass fibers; wherein the composition comprises a continuous phase comprising the first polyamide-6,6 and the second polyamide-6,6; and a dispersed phase comprising the poly(arylene ether); and wherein the composition exhibits a tensile elongation at break of 5 to 7 percent measured at 23° C. according to ISO 527-2, a melt volume-flow rate of 40 to 45 cubic centimeters per 10 minutes, measured at 280° C. and 5 kilogram load according to ISO 1133, a heat deflection temperature of 240 to 255° C. measured at 0.45 megapascals pressure according to ISO 75.

The invention is further illustrated by the following non-limiting examples.

Example 1, Comparative Examples 1-7

These examples illustrate the effects of poly(arylene ether) intrinsic viscosity and polyamide relative viscosity on the properties of a compatibilized blend.

All compositions were prepared from the components described in Table 1.

TABLE 1

| Component | Description |
| --- | --- |
| PPE, 0.12 IV | Poly(2,6-dimethyl-1,4-phenylene ether) having an intrinsic viscosity of 0.12 deciliter per gram measured at 25° C. in chloroform; obtained as PPO 612 from SABIC Innovative Plastics LLC |
| PPE, 0.3 IV | Poly(2,6-dimethyl-1,4-phenylene ether) having an intrinsic viscosity of 0.3 deciliter per gram measured at 25° C. in chloroform; obtained as PPO 630 from SABIC Innovative Plastics LLC |
| PPE, 0.4 IV | Poly(2,6-dimethyl-1,4-phenylene ether) having an intrinsic viscosity of 0.4 deciliter per gram measured at 25° C. in chloroform; obtained as PPO 640 from SABIC Innovative Plastics LLC |
| PPE, 0.46 IV | Poly(2,6-dimethyl-1,4-phenylene ether) having an intrinsic viscosity of 0.46 deciliter per gram measured at 25° C. in chloroform; obtained as PPO 646 from SABIC Innovative Plastics LLC |
| Antioxidant | A hindered phenol antioxidant obtained as Anox PP18 from Great Lakes Chemical Corp. |
| PETS | Pentaerythritol tetrastearate, obtained as GLYCOLUBE P from Lonza, Inc. |
| Cupric acetate | Cupric acetate, obtained from Barker Industries, Inc. |
| Cupric chloride | Cupric chloride dehydrate, obtained from Barker Industries, Inc. |
| Citric acid | Citric acid, anhydrous, obtained from Cargill Inc. |
| KI solution | Potassium iodide solution, 33 weight percent in water, obtained from Deepwater Chemicals |
| Stearyl erucamide | Stearyl erucamide, obtained from Croda Universal, Inc. |
| PA 66, high flow | Polyamide-6,6 having a relative viscosity of 34.4 to 37.7, as measured according to ASTM D789-07 in a 1 weight percent solution of the polyamide-6,6 in 90 weight percent formic acid; obtained as Vydyne 21Z from Rhodia Polyamide Corp. |
| SEBS | Polystyrene-poly(ethylene-butylene)-polystyrene triblock copolymer having about 33 weight percent polystyrene, obtained as Kraton G1651H from Kraton Polymers |
| PA 66, low flow | Polyamide-6,6 having a relative viscosity of 44.2 to 48.2, as measured according to ASTM D789-07 in a 1 weight percent solution of the polyamide-6,6 in 90 weight percent formic acid; obtained as ULTRAMID 105 from Rhodia Polyamide Corporation |
| Glass | Glass fibers having a diameter of about 12 micrometers and a pre-compounding length of about 0.5 centimeters, obtained as 701H from Johns Manville International Inc. |

Compositions and properties are presented in Table 2, where component amounts are expressed in parts by weight. The extruder used was a 30-millimeter internal diameter Werner-Pfleiderer twin-screw extruder. The extruder had ten barrel segments, each of which was heated to 290° C. Poly (arylene ether), citric acid, cuprous iodide, SEBS, antioxidant, pentaerythritol tetrastearate, cupric acetate, cupric chloride, potassium iodide solution, and stearyl erucamide were dry blended and added in the feedthroat of the extruder. The polyamides were added downstream along with the glass fibers. The polyamides can be split fed such that some of the polyamide is added in the feedthroat (along with the poly (arylene ether) dry blend) and some is added downstream along concurrently with the glass (separate feeders are used). The rotation rate of the extruder screw was 300 rotations per minute (rpm) and the federate was 40 pounds per hour (18.1 kilograms/hour).

The extrudates were cooled and pelletized, and the resulting pellets were used to injection mold test objects for physical property testing. Flexural modulus was measured at 23° C. according to ISO 178:2001. Tensile strain (elongation) at break was measured according to ISO 527-2:1993. Heat deflection temperature was measured at 0.45 megapascals pressure according to ISO 75-2:2004. Unnotched Izod impact strength was measured using a hammer energy of 5.5 joules, and notched Izod impact strength measured using a hammer energy of 2.75 joules were determined according ISO 180:2000. Vicat softening temperature was measured according to ISO 306:2004. Melt volume flow rate was measured at 280° C. and 5 kilogram load according to ISO 1133:2005. Dynatup total energy was measured at 23° C. according ASTM D3763-06.

The results in Table 2 show that only the Example 1 composition achieved the desired combination of a tensile elongation at break greater than 5% (which the present inventor has found to be a good predictor of fatigue resistance), a heat deflection temperature greater than 220° C., and a melt volume-flow rate of at least 40 cubic centimeters per 10 minutes. All of these properties are important for the fabrication and performance of automotive under-the-hood electrical connectors, and the composition is useful for the fabrication of many other molded articles. Comparative Examples 1 and 2, which use high intrinsic viscosity poly(arylene ether)s, exhibit insufficient melt flow. Comparative Examples 3-5, which lack glass fibers and in which all of the polyamide is a high flow polyamide, exhibit insufficient stiffness (flexural modulus), and insufficient heat resistance (heat deflection temperature and Vicat softening temperature). Comparative Example 6, in which a poly(arylene ether) average intrinsic viscosity is achieved by blending poly(arylene ether) resins with intrinsic viscosities of 0.12 and 0.46 deciliter per gram, exhibits insufficient tensile strength. And Comparative Example 7, which also uses a poly(arylene ether) blend and further lacks glass fibers, exhibits insufficient heat resistance (heat deflection temperature and Vicat softening temperature). Given that polyamide resides primarily in the continuous phase and poly(arylene ether) resides primarily in the dispersed phase in these blends, it is very surprising that the physical properties are so sensitive to the poly(arylene ether) molecular weight distribution.

TABLE 2

|  | Ex. 1 | C. Ex. 1 | C. Ex. 2 | C. Ex. 3 |
|---|---|---|---|---|
| Compositions | | | | |
| PPE, 0.12 IV | 0 | 0 | 0 | 0 |
| PPE, 0.3 IV | 22.63 | 0 | 0 | 22.71 |
| PPE, 0.4 IV | 0 | 22.63 | 0 | 0 |
| PPE, 0.46 IV | 0 | 0 | 22.63 | 0 |
| Antioxidant | 0.20 | 0.20 | 0.20 | 0.22 |
| PETS | 0.20 | 0.20 | 0.20 | 0.22 |
| Cupric acetate | 0.01 | 0.01 | 0.01 | 0.02 |
| Cupric chloride | 0.01 | 0.01 | 0.01 | 0.02 |
| Citric acid | 0.40 | 0.40 | 0.40 | 0.43 |
| KI solution | 0.29 | 0.29 | 0.29 | 0.33 |
| Stearyl erucamide | 0.25 | 0.25 | 0.25 | 0.27 |
| PA 66, high flow | 46.64 | 46.64 | 46.64 | 69.36 |
| SEBS | 5.90 | 5.90 | 5.90 | 6.43 |
| PA 66, low flow | 15.33 | 15.33 | 15.33 | 0 |
| Glass | 7.84 | 7.84 | 7.84 | 0 |
| Properties | | | | |
| Flexural modulus (MPa) | 3950 ± 29 | 3691 ± 66 | 3807 ± 131 | 2508 ± 51 |
| Tensile elongation (%) | 6.06 ± 1.32 | 8.10 ± 0.79 | 6.84 ± 0.24 | 6.30 ± 0.17 |
| Heat deflection temp. (° C.) | 252 ± 1 | 246 ± 2 | 248 ± 6 | 186 ± 3 |
| Izod impact strength, 5.5 J, unnotched (kJ/m$^2$) | 53.6 ± 5.0 | 54.4 ± 3.2 | 55.1 ± 2.5 | 13.8 ± 3.1 |
| Izod impact strength, 2.75 J, notched (kJ/m$^2$) | 7.62 ± 1.4 | 9.36 ± 0.98 | 7.27 ± 2.13 | 129.27 ± 24.47 |
| Vicat softening temp. (° C.) | 236 ± 0.6 | 232 ± 0.4 | 234 ± 0.5 | 203 ± 0.9 |
| Melt volume-flow rate at 280° C. and 5 kg load (mL/10 min) | 43.40 ± 0.79 | 31.30 ± 0.54 | 36.60 ± 0.59 | 109.64 ± 1.72 |
| Dynatup total energy (J) | 3.4 ± 0.2 | 3.8 ± 0.2 | 3.3 ± 0.3 | 41.7 ± 13.1 |

|  | C. Ex. 4 | C. Ex. 5 | C. Ex. 6 | C. Ex. 7 |
|---|---|---|---|---|
| Compositions | | | | |
| PPE, 0.12 IV | 0 | 0 | 7.39 | 8.03 |
| PPE, 0.3 IV | 0 | 0 | 0 | 0 |
| PPE, 0.4 IV | 22.71 | 0 | 0 | 0 |
| PPE, 0.46 IV | 0 | 22.71 | 13.50 | 14.68 |
| Antioxidant | 0.22 | 0.22 | 0.20 | 0.22 |
| PETS | 0.22 | 0.22 | 0.20 | 0.22 |
| Cupric acetate | 0.02 | 0.02 | 0.01 | 0.02 |
| Cupric chloride | 0.02 | 0.02 | 0.01 | 0.02 |
| Citric acid | 0.43 | 0.43 | 0.40 | 0.43 |
| KI solution | 0.33 | 0.33 | 0.30 | 0.33 |
| Stearyl erucamide | 0.27 | 0.27 | 0.25 | 0.27 |
| PA 66, high flow | 69.36 | 69.36 | 62.00 | 67.39 |
| SEBS | 6.43 | 6.43 | 5.92 | 6.43 |
| PA 66, low flow | 0 | 0 | 0 | 0 |
| Glass | 0 | 0 | 8.00 | 0 |
| Properties | | | | |
| Flexural modulus (MPa) | 2582 ± 37 | 2553 ± 30 | 3680 ± 95 | 2577 ± 31 |
| Tensile elongation (%) | 7.00 ± 0.70 | 7.38 ± 1.44 | 3.91 ± 0.04 | 5.47 ± 0.24 |
| Heat deflection temp. (° C.) | 188 ± 2 | 185 ± 6 | 247 ± 2 | 174 ± 1 |
| Izod impact strength, 5.5 J, unnotched (kJ/m$^2$) | 12.7 ± 2.0 | 14.1 ± 1.5 | 44.3 ± 6.1 | 62.5 ± 51.9 |
| Izod impact strength, 2.75 J, notched (kJ/m$^2$) | DNB* | DNB | 5.20 ± 0.70 | 6.25 ± 1.48 |
| Vicat softening temp. (° C.) | 204 ± 0.1 | 205 ± 0.6 | 223 ± 1.3 | 204 ± 0.6 |

TABLE 2-continued

| | | | | |
|---|---|---|---|---|
| Melt volume-flow rate at 280° C. and 5 kg load (mL/10 min) | 109.60 ± 1.35 | 115.72 ± 1.25 | 42.14 ± 0.15 | 71.70 ± 0.39 |
| Dynatup total energy (J) | 40.0 ± 16.9 | 40.5 ± 10.1 | 2.4 ± 0.3 | 4.4 ± 2.3 |

DNB = did not break

Examples 2-5

Four illustrative inventive compositions are presented in Table 3, below, where component amounts are expressed in parts by weight.

TABLE 3

| | Ex. 2 | Ex. 3 | Ex. 4 | Ex. 5 |
|---|---|---|---|---|
| Compositions | | | | |
| PPE, 0.3 IV | 18.00 | 18.00 | 27.00 | 27.00 |
| Antioxidant | 0.20 | 0.20 | 0.20 | 0.20 |
| PETS | 0.20 | 0.20 | 0.20 | 0.20 |
| Cupric acetate | 0.01 | 0.01 | 0.01 | 0.01 |
| Cupric chloride | 0.01 | 0.01 | 0.01 | 0.01 |
| Citric acid | 0.40 | 0.40 | 0.40 | 0.40 |
| KI solution | 0.29 | 0.29 | 0.29 | 0.29 |
| Stearyl erucamide | 0.25 | 0.25 | 0.25 | 0.25 |
| PA 66, high flow | 49.00 | 44.00 | 44.00 | 45.00 |
| SEBS | 6.00 | 6.00 | 6.00 | 6.00 |
| PA 66, low flow | 18.30 | 14.30 | 14.30 | 13.30 |
| Glass | 7.80 | 7.80 | 7.80 | 7.80 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition, comprising:
65 to 92 weight percent of a compatibilized blend of a polyamide and a poly(arylene ether);
3 to 9 weight percent of a polystyrene-poly(ethylene-butylene)-polystyrene triblock copolymer; and
5 to 15 weight percent glass fibers;
wherein the composition comprises 40 to 50 weight percent of a first polyamide-6,6 having a first relative viscosity, and 10 to 20 weight percent of a second polyamide-6,6 having a second relative viscosity greater than the first relative viscosity;
wherein the composition comprises 15 to 30 weight percent of the poly(arylene ether); wherein the poly(arylene ether) has a monomodal molecular weight distribution and an intrinsic viscosity of 0.28 to 0.38 deciliter per gram, as measured at 25° C. in chloroform; and
wherein all weight percents are based on the total weight of the composition.

2. The composition of claim 1, wherein the poly(arylene ether) consists of poly(2,6-dimethyl-1,4-phenylene ether).

3. The composition of claim 1, wherein the first relative viscosity is 30 to 40, as measured according to ASTM D789 in a 1 weight percent solution of the first polyamide-6,6 in 90 weight percent formic acid.

4. The composition of claim 1, wherein the second relative viscosity is 40 to 55, as measured according to ASTM D789 in a 1 weight percent solution of the second polyamide-6,6 in 90 weight percent formic acid.

5. The composition of claim 1, wherein the first relative viscosity and the second relative viscosity differ by at least 8, wherein the first relative viscosity is measured according to ASTM D789 in a 1 weight percent solution of the first polyamide-6,6 in 90 weight percent formic acid, and wherein the second relative viscosity is measured according to ASTM D789 in a 1 weight percent solution of the second polyamide-6,6 in 90 weight percent formic acid.

6. The composition of claim 1, wherein the first relative viscosity and the second relative viscosity differ by 8 to 20, wherein the first relative viscosity is measured according to ASTM D789 in a 1 weight percent solution of the first polyamide-6,6 in 90 weight percent formic acid, and wherein the second relative viscosity is measured according to ASTM D789 in a 1 weight percent solution of the second polyamide-6,6 in 90 weight percent formic acid.

7. The composition of claim 1, wherein the poly(arylene ether) has a number average molecular weight of 15,000 to 25,000 atomic mass units.

8. The composition of claim 1, wherein the poly(arylene ether) has a weight average molecular weight of 45,000 to 55,000 atomic mass units.

9. The composition of claim 1, wherein the poly(arylene ether) has a polydispersity index of 2.0 to 3.5.

10. The composition of claim 1, wherein the poly(arylene ether) comprises less than 20 weight percent of molecules having a molecular weight less than 10,000 atomic mass units.

11. The composition of claim 1, wherein the poly(arylene ether) comprises less than 10 weight percent of molecules having a molecular weight greater than 100,000 atomic mass units.

12. The composition of claim 1, wherein the poly(arylene ether) does not comprise a blend of two or more poly(arylene ether)s having different intrinsic viscosities.

13. The composition of claim 1, comprising less than 28 parts by weight of the poly(arylene ether) per 100 parts by weight total of the first polyamide-6,6, the second polyamide-6,6, and the poly(arylene ether).

14. The composition of claim 1, wherein the polystyrene poly(ethylene-butylene)-polystyrene triblock copolymer has a weight average molecular weight of 200,000 to 450,000 atomic mass units.

15. The composition of claim 1, comprising
a continuous phase comprising the first polyamide-6,6 and the second polyamide-6,6, and
a dispersed phase comprising the poly(arylene ether).

16. The composition of claim 1, exhibiting a tensile elongation at break of at least 5 percent, measured at 23° C. according to ISO 527-2.

17. The composition of claim 1, exhibiting a tensile elongation at break of 5 to 7 percent, measured at 23° C. according to ISO 527-2.

18. The composition of claim 1, exhibiting a melt volume-flow rate of at least 40 cubic centimeters per 10 minutes, measured at 280° C. and 5 kilogram load according to ISO 1133.

19. The composition of claim 1, exhibiting a melt volume-flow rate of 40 to 45 cubic centimeters per 10 minutes, measured at 280° C. and 5 kilogram load according to ISO 1133.

20. The composition of claim 1, exhibiting a heat deflection temperature of at least 220° C. measured at 0.45 megapascals pressure according to ISO 75.

21. The composition of claim 1, exhibiting a heat deflection temperature of 220 to 255° C. measured at 0.45 megapascals pressure according to ISO 75.

22. The composition of claim 1,
wherein the composition comprises 45 to 48 weight percent of the first polyamide-6,6;
wherein the first relative viscosity is 34 to 38 as measured according to ASTM D789 in a 1 weight percent solution of the first polyamide-6,6 in 90 weight percent formic acid;
wherein the composition comprises 13 to 17 weight percent of the second polyamide-6,6;
wherein the second relative viscosity is 46 to 50 as measured according to ASTM D789 in a 1 weight percent solution of the second polyamide-6,6 in 90 weight percent formic acid;
wherein the compatibilized blend comprises 20 to 25 weight percent of the poly(arylene ether);
wherein the poly(arylene ether) comprises less than 10 weight percent of molecules having a molecular weight less than 10,000 atomic mass units;
wherein the composition comprises 4 to 8 weight percent of a polystyrene poly(ethylene-butylene)-polystyrene triblock copolymer having a weight average molecular weight of 200,000 to 400,000 atomic mass units; and
wherein the composition comprises 7 to 9 weight percent glass fibers;
wherein the composition comprises a continuous phase comprising the first polyamide-6,6 and the second polyamide-6,6; and a dispersed phase comprising the poly(arylene ether); and
wherein the composition exhibits
a tensile elongation at break of 5 to 7 percent measured at 23° C. according to ISO 527-2,
a melt volume-flow rate of 40 to 45 cubic centimeters per 10 minutes, measured at 280° C. and 5 kilogram load according to ISO 1133,
a heat deflection temperature of 240 to 255° C. measured at 0.45 megapascals pressure according to ISO 75.

23. An article comprising the composition of claim 1.

24. An automotive under-the-hood electrical connector comprising the composition of claim 1.

25. An article comprising the composition of claim 22.

26. An automotive under-the-hood electrical connector comprising the composition of claim 22.

27. A method of preparing a composition, comprising:
melt kneading
40 to 50 weight percent of a first polyamide-6,6 having a first relative viscosity,
10 to 20 weight percent of a second polyamide-6,6 having a second relative viscosity greater than the first relative viscosity,
15 to 30 weight percent of a poly(arylene ether) having a monomodal molecular weight distribution and an intrinsic viscosity of 0.28 to 0.38 deciliter per gram, as measured at 25° C. in chloroform,
3 to 9 weight percent of a polystyrene-poly(ethylene-butylene)-polystyrene triblock copolymer, and
5 to 15 weight percent glass fibers, and
an amount of a compatibilizing agent effective to compatibilize the polyamide and the poly(arylene ether)
to form the compatibilized blend of a polyamide and a poly(arylene ether);
wherein all weight percents are based on the total weight of the composition.

28. The method of claim 27,
wherein the composition comprises 45 to 48 weight percent of the first polyamide-6,6;
wherein the first relative viscosity is 34 to 38, as measured according to ASTM D789 in a 1 weight percent solution of the first polyamide-6,6 in 90 weight percent formic acid;
wherein the composition comprises 13 to 17 weight percent of the second polyamide-6,6;
wherein the second relative viscosity is 46 to 50, as measured according to ASTM D789 in a 1 weight percent solution of the first polyamide-6,6 in 90 weight percent formic acid;
wherein the compatibilized blend comprises 20 to 25 weight percent of the poly(arylene ether);
wherein the poly(arylene ether) comprises less than 10 weight percent of molecules having a molecular weight less than 10,000 atomic mass units;
wherein the composition comprises 4 to 8 weight percent of a polystyrene poly(ethylene-butylene)-polystyrene triblock copolymer having a weight average molecular weight of 200,000 to 400,000 atomic mass units; and
wherein the composition comprises 7 to 9 weight percent glass fibers;
wherein the composition comprises a continuous phase comprising the first polyamide-6,6 and the second polyamide-6,6; and a dispersed phase comprising the poly(arylene ether); and
wherein the composition exhibits
a tensile elongation at break of 5 to 7 percent measured at 23° C. according to ISO 527-2,
a melt volume-flow rate of 40 to 45 cubic centimeters per 10 minutes, measured at 280° C. and 5 kilogram load according to ISO 1133,
a heat deflection temperature of 240 to 255° C. measured at 0.45 megapascals pressure according to ISO 75.

* * * * *